United States Patent
Bernacchi et al.

(10) Patent No.: US 10,935,142 B2
(45) Date of Patent: Mar. 2, 2021

(54) MOUNTING ASSEMBLY FOR A CERAMIC SEAL RUNNER

(71) Applicant: Rolls-Royce Corporation, Indianapolis, IN (US)

(72) Inventors: James Alfredo Bernacchi, Indianapolis, IN (US); Mark William Schubert, Indianapolis, IN (US); Joseph Black, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 204 days.

(21) Appl. No.: 16/285,476

(22) Filed: Feb. 26, 2019

(65) Prior Publication Data

US 2020/0248817 A1     Aug. 6, 2020

Related U.S. Application Data

(63) Continuation-in-part of application No. 16/265,557, filed on Feb. 1, 2019, and a continuation-in-part of application No. 16/265,506, filed on Feb. 1, 2019.

(51) Int. Cl.
| | | |
|---|---|---|
| *F16J 15/40* | (2006.01) | |
| *F16J 15/44* | (2006.01) | |
| *F01D 11/00* | (2006.01) | |

(52) U.S. Cl.
CPC .......... *F16J 15/445* (2013.01); *F01D 11/003* (2013.01); *F16J 15/441* (2013.01); *F05D 2260/38* (2013.01)

(58) Field of Classification Search
CPC ........ F16J 15/3464; F16J 15/445; F16J 15/44; F16J 15/441; F01D 11/003; F05D 2260/38; F05D 2260/30
See application file for complete search history.

(56) References Cited

U.S. PATENT DOCUMENTS

| | | | | |
|---|---|---|---|---|
| 3,559,725 | A | * | 2/1971 | Fucinari ................ F28D 19/047 165/7 |
| 3,770,179 | A | | 11/1973 | McHugh |
| 3,894,741 | A | | 7/1975 | McHugh |

(Continued)

FOREIGN PATENT DOCUMENTS

| | | |
|---|---|---|
| DE | 2216762 A1 | 10/1972 |
| EP | 0602272 A1 | 6/1994 |

(Continued)

*Primary Examiner* — Eugene G Byrd
(74) *Attorney, Agent, or Firm* — Barnes & Thornburg LLP

(57) ABSTRACT

A seal assembly is disclosed for sealing a higher pressure fluid cavity from a lower pressure fluid cavity. The seal assembly comprises a ceramic seal runner and a mounting assembly. The ceramic seal runner extends around an axial portion of a shaft. The mounting assembly is affixed to and carries the seal runner in axial and radial alignment with the shaft. The mounting assembly comprises an annular base member, a plurality of flexible members, and an annular sleeve member. The plurality of flexible members are circumferentially spaced about the base member and each extend radially outward from one end affixed to the base member in a direction opposite the direction of rotation of the shaft to a distal end. The annular sleeve member is positioned to engage the distal ends of the flexible members and a radially inner surface of the seal runner.

20 Claims, 12 Drawing Sheets

(56) References Cited

U.S. PATENT DOCUMENTS

| | | | | |
|---|---|---|---|---|
| 4,398,866 A | * | 8/1983 | Hartel | F01D 11/08 |
| | | | | 415/173.1 |
| 4,744,721 A | * | 5/1988 | Villeneuve | F04D 29/128 |
| | | | | 277/350 |
| 4,897,021 A | * | 1/1990 | Chaplin | F01D 5/22 |
| | | | | 415/173.7 |
| 5,014,999 A | * | 5/1991 | Makhobey | F01D 11/003 |
| | | | | 277/422 |
| 5,039,113 A | * | 8/1991 | Gardner | F16J 15/3412 |
| | | | | 277/379 |
| 5,344,161 A | * | 9/1994 | Sandgren | F16C 35/077 |
| | | | | 267/1.5 |
| 5,533,739 A | * | 7/1996 | Sedy | F16J 15/3472 |
| | | | | 277/390 |
| 5,538,257 A | | 7/1996 | Sandgren | |
| 5,626,347 A | * | 5/1997 | Ullah | F01D 11/003 |
| | | | | 277/399 |
| 6,132,168 A | * | 10/2000 | Kovaleski | F01D 11/001 |
| | | | | 415/107 |
| 6,224,322 B1 | * | 5/2001 | Calboreanu | F04D 29/126 |
| | | | | 277/423 |
| 6,322,081 B1 | * | 11/2001 | Ullah | F16C 33/76 |
| | | | | 277/504 |
| 6,666,460 B2 | * | 12/2003 | Diana | F01D 11/005 |
| | | | | 277/608 |
| 7,175,388 B2 | | 2/2007 | Labbe et al. | |
| 7,410,341 B2 | | 8/2008 | Gockel et al. | |
| 7,549,836 B2 | * | 6/2009 | Anderson | F01D 25/16 |
| | | | | 277/500 |
| 7,905,495 B2 | | 3/2011 | Munson | |
| 8,690,159 B2 | | 4/2014 | Peer et al. | |
| 8,834,106 B2 | * | 9/2014 | Luczak | F01D 11/12 |
| | | | | 415/173.3 |
| 9,359,912 B2 | * | 6/2016 | Ullah | F01D 11/003 |
| 2002/0140177 A1 | * | 10/2002 | Murray | F16J 15/324 |
| | | | | 277/500 |
| 2003/0015842 A1 | * | 1/2003 | Wilhelm | F04D 29/143 |
| | | | | 277/390 |
| 2007/0262532 A1 | * | 11/2007 | Ohama | F16J 15/3404 |
| | | | | 277/390 |
| 2009/0045587 A1 | * | 2/2009 | DeAngelis | F01L 1/3442 |
| | | | | 277/500 |
| 2009/0142180 A1 | * | 6/2009 | Munson | F01D 11/003 |
| | | | | 415/111 |
| 2010/0172754 A1 | * | 7/2010 | Flanagan | F01D 11/18 |
| | | | | 415/208.2 |
| 2011/0123329 A1 | | 5/2011 | Takeuchi et al. | |
| 2012/0177486 A1 | | 7/2012 | Ullah et al. | |
| 2014/0265151 A1 | * | 9/2014 | Vasagar | F01D 11/003 |
| | | | | 277/500 |
| 2015/0115539 A1 | | 4/2015 | Guenther et al. | |
| 2017/0234430 A1 | | 6/2017 | Fadgen | |
| 2017/0234432 A1 | | 8/2017 | Burnside et al. | |

FOREIGN PATENT DOCUMENTS

| | | | |
|---|---|---|---|
| EP | 0602272 B1 | 4/1997 | |
| EP | 2474711 A2 | 7/2012 | |
| EP | 3208503 A1 | 8/2017 | |
| EP | 2474711 B1 | 7/2018 | |
| JP | 10151333 A | * 6/1998 | ........... F16J 15/3464 |
| WO | 2014/143097 A1 | 9/2014 | |

* cited by examiner

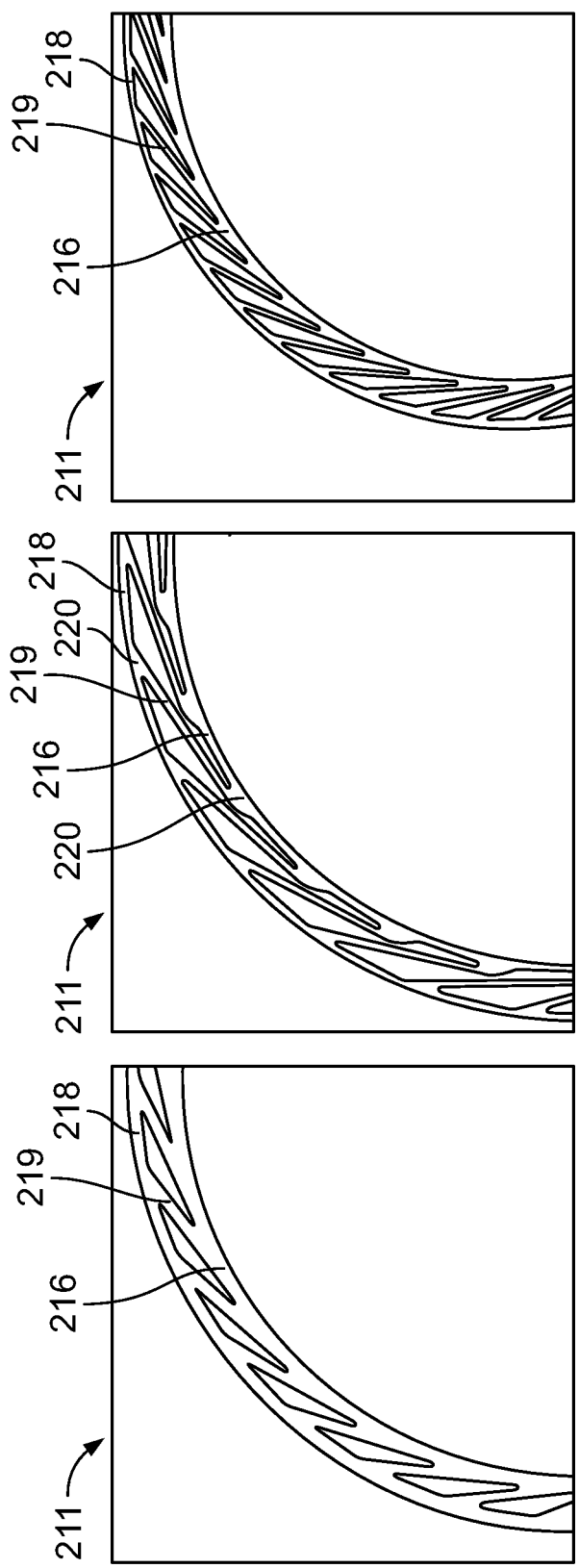

MOUNTING ASSEMBLY FOR A CERAMIC SEAL RUNNER

CROSS-REFERENCE TO RELATED APPLICATIONS

This application is related to and claims priority to U.S. patent application Ser. No. 16/265,506, filed Feb. 1, 2019 and entitled "Seal Assembly with Spring Retainer Runner Mount Assembly," and U.S. patent application Ser. No. 16/265,557, filed Feb. 1, 2019 and entitled "Mounting Assembly for a Ceramic Seal Runner." The entirety of these applications are herein incorporated by reference.

BACKGROUND

Seals and seal assemblies may be used to isolate cavities of different pressures in a machine. For example, in a gas turbine engine a seal assembly may be used to seal a sump from higher pressure and temperature airflows elsewhere in the engine, such that oil is retained in the sump and not permitted to migrate to other regions of the engine. Oil leakage from a sump can lead to undesirable conditions such as fires, smoke, coking, and migration of oil smell.

A seal assembly typically comprises a seal ring engaged with a runner. The runner is often carried by a runner mount that is coupled to a rotatable shaft. Engagement between the seal ring and runner creates the seal.

Some existing runner mounts hold the runner in place by contacting both a radially inner and a radially outer surface of the runner. These runner mount designs can lead to excessive stresses in the runner and/or the runner mount due to edge loading along the runner/runner mount interface at the radially outer surface of the runner. These runner mount designs also require that a portion of the radially outer surface of the runner—i.e. the surface that forms a seal through engagement with the seal ring—be dedicated to mounting as opposed to sealing. Improvements in runner mount designs are therefore desirable.

SUMMARY

According to some aspects of the present disclosure, an assembly is disclosed that includes a ceramic seal runner mounted to a rotatable shaft. The assembly comprises a rotatable shaft having a direction of rotation; an annular ceramic seal runner extending around an axial portion of said shaft; and a mounting assembly affixed to said shaft and carrying said seal runner in axial and radial alignment with said shaft. The mounting assembly comprises an annular base member affixed to said shaft; a plurality of flexible members circumferentially spaced about said base member, each of said flexible members extending radially outward from one end affixed to said base member in a direction opposite the direction of rotation of said shaft to a distal end; and an annular sleeve member positioned so that a radially inner surface engages the distal ends of said flexible members and a radially outer surface engages a radially inner surface of said seal runner.

In some embodiments one or more of said flexible members extend radially outward from said base member along a tangent of said base member. In some embodiments the distal end of each flexible member is affixed to said sleeve member. In some embodiments each of said flexible members extend radially outward from said base member along a tangent of said base member. In some embodiments the distal end of each flexible member is affixed to said sleeve member. In some embodiments each of said flexible members extend radially outward from said base member at an angle between −10° and +20° of a tangent of said base member.

In some embodiments one or more of said flexible members extend axially from a first axial edge of said base member to a second axial edge of said base member. In some embodiments each of said flexible members extend axially from a first axial edge of said base member to a second axial edge of said base member. In some embodiments said base member comprises a plurality of axial ribs circumferentially spaced about said base member and extending radially away from said base member, and wherein each of said flexible members is affixed at one end to a rib of said base member. In some embodiments said sleeve member comprises a plurality of axial ribs circumferentially spaced about the sleeve member and extending radially inward from said sleeve member, and wherein each of said flexible members is affixed at the distal end to a rib of said sleeve member.

According to further aspects of the present disclosure, a runner mounting assembly comprises a rotatable shaft having a direction of rotation; an annular ceramic seal runner extending around an axial portion of said shaft; and a mounting assembly affixed to said shaft and carrying said seal runner in axial and radial alignment with said shaft. The mounting assembly comprises an annular inner member coupled to said shaft; an annular outer member coupled to said ceramic seal runner; and a plurality of spokes circumferentially spaced about said inner member, each spoke of said plurality of spokes extends from said inner member to said outer member in a direction opposite the direction of rotation of said shaft.

In some embodiments each of the plurality of spokes extend radially outward from the inner member along a tangent of the inner member. In some embodiments each of the plurality of spokes extend radially outward from the inner member at an angle between −10° and +20° of a tangent of the inner member. In some embodiments said inner member comprises a plurality of axial ribs circumferentially spaced about said inner member and extending radially away from said inner member, and wherein each of said spokes is affixed at one end to a rib of said inner member. In some embodiments said outer member comprises a plurality of axial ribs circumferentially spaced about the outer member and extending radially inward from said outer member, and wherein each of said spokes is affixed at a distal end to a rib of said outer member. In some embodiments each of said spokes extend axially from a first axial edge of said inner member to a second axial edge of said inner member.

According to still further aspects of the present disclosure, a method is provided for mounting a ceramic seal runner in radial and axial alignment to a rotatable shaft. The method comprises: affixing a runner mount to the shaft, the runner mount comprising an annular inner member, an annular outer member, and a plurality of spokes circumferentially spaced about the inner member and extending between the inner member and outer member; and affixing the ceramic seal runner to the annular outer member, whereby the plurality of spokes deflect responsive to thermal expansion of the runner mount.

In some embodiments affixing the runner mount to the shaft comprises providing an interference fit between the annular inner member and the shaft. In some embodiments affixing the ceramic seal runner to the annular out member comprises providing an interference fit between the ceramic seal runner and the annular outer member. In some embodiments the method further comprises affixing one or more axial retainers to the shaft adjacent the runner mount.

BRIEF DESCRIPTION OF THE DRAWINGS

The following will be apparent from elements of the figures, which are provided for illustrative purposes.

FIG. 3A is a profile view of a portion of a first runner mount of the seal assembly in accordance with some embodiments of the present disclosure.

FIG. 3B is a profile view of a portion of a second runner mount of the seal assembly in accordance with some embodiments of the present disclosure.

FIG. 3C is a profile view of a portion of a third runner mount of the seal assembly in accordance with some embodiments of the present disclosure.

Figure 1:
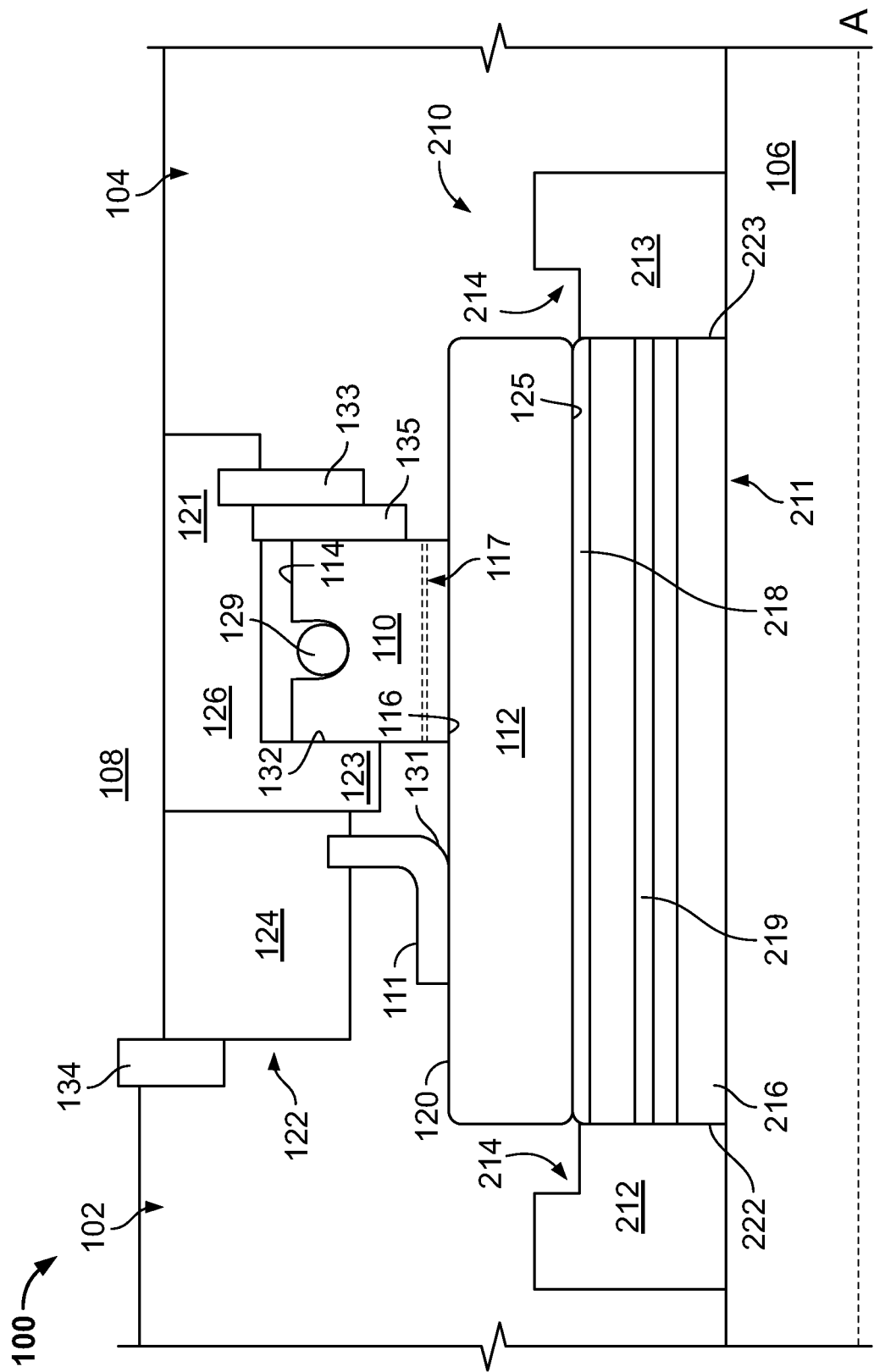
FIG. 1 is a schematic cross sectional view of a seal assembly taken along an axis of the seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Seal assemblies in rotating machines such as gas turbine engines that use a circumferential carbon seal ring and ceramic runner offer numerous advantages over existing seal assemblies that typically use a metal runner. Clearance between the carbon seal ring and ceramic runner can be more closely controlled because the materials of the seal ring and runner have closer and/or matched coefficients of thermal expansion. Closer clearance control over the full range of operating conditions ensures less leakage and less risk of oil passing through the seal assembly. Further, the use of a ceramic runner may allow for the reduction or elimination of direct oil cooling to the runner, as the ceramic runner is able to operate at higher temperatures. Reduction or elimination of direct oil cooling carries additional benefits, namely reducing the size and complexity of oil cooling systems.

However, a seal mount is required for this type of seal assembly in order to mount the ceramic runner to the metal rotatable shaft and compensate for the differential thermal growth between the runner and the shaft. The seal mount must provide adequate compliance between the shaft and the ceramic to accommodate any unacceptable stresses, excursions, and/or deflections.

Runners made from ceramic tend to have relatively high compressive yield stress but relatively low tensile yield stress. Ceramic runners also tend to be brittle, with a small elastic region. With these material difficulties in mind, ceramic runners must be coupled in some manner to the metal rotatable shaft of the engine. The assembly for mounting the runner to the shaft necessarily must account for differences in the coefficient of thermal expansion between the ceramic runner and the metal shaft, and must also accommodate excursions in the relative positioning between the two. Existing ceramic runner mounts may use a "clip" approach that includes runner/runner mount interfaces along both the radially inner and radially outer surfaces of the runner. These interfaces ensure that the runner mount is able to hold the runner against the seal ring to maintain an effective seal, while also allowing some degree of flexing between the runner and the rotatable shaft.

Unfortunately, the clip approach to runner mount design can negatively impact the effective lifespan of the runner and/or the runner mount. The runner/runner mount interface along the radially outer surface of the runner may experience excessive stresses (i.e. edge loading) during operation, leading to wear of one or more components at an unacceptable rate. For example, excessive wear may occur at the interface between the clip and the ceramic runner. Further, the clip approach reduces the size of the radially outer surface of the runner available for sealing because some portion of that surface is used for mounting purposes.

To prevent excessive edge loading at the runner/runner mount interface along the radially outer surface of the runner and to free a portion of that radially outer surface, the present disclosure is directed to systems and methods of forming a seal in a rotating machine. A seal assembly may comprise a mounting assembly, a runner, and a seal ring. The mounting assembly may comprise a runner mount coupled between the shaft and the runner, and a pair of axial retainers. The runner mount may comprise an inner member, an outer member, and a plurality of spokes extending between the inner and outer members. The spokes may extend at a tangent from the inner member, and may extend opposite the rotational direction of the shaft. In other embodiments the runner mount may comprise an annular base, a plurality of flexible members extending radially outward from the base, and a sleeve member. The seal assembly may further comprise a buffered annular sealing member or lip seal.

Figure 2:
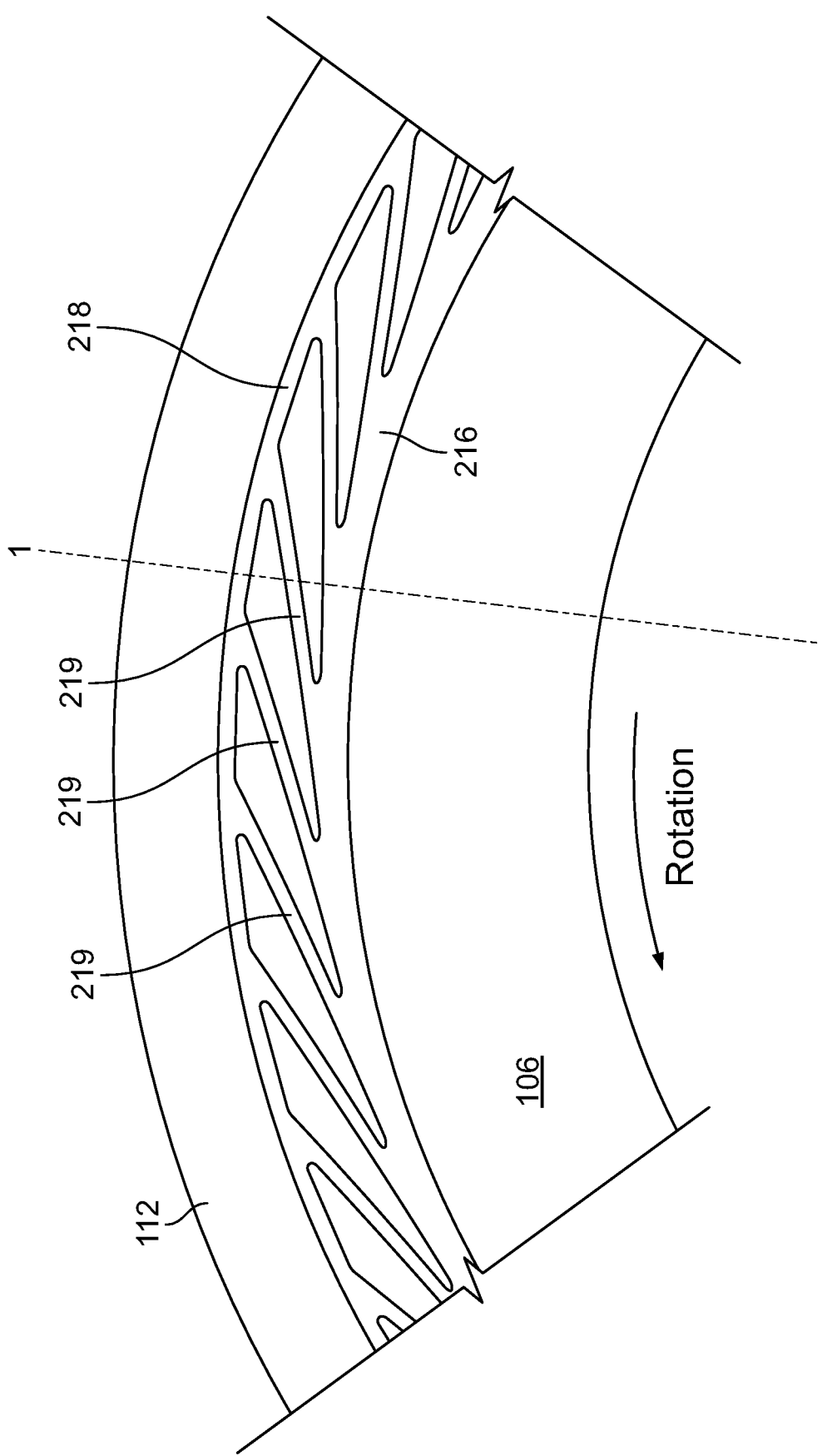
FIG. 2 is a schematic cross sectional view of a seal assembly taken perpendicular to an axis of the seal assembly in accordance with some embodiments of the present disclosure.

Schematic cross sectional views of an embodiment of the seal assembly 100 are provided in FIGS. 1 and 2. FIG. 1 presents a schematic cross section taken along or parallel to an axis of rotation of the shaft 106 and may be referred to as a lateral cross section. FIG. 2 presents a schematic cross section taken perpendicular to the axis of rotation of shaft 106 and may be referred to as an axial cross section.

The seal assembly 100 seals a higher pressure fluid cavity 104 from a lower pressure fluid cavity 102. The higher and lower pressure fluid cavities 104, 102 may be at least partially disposed between a rotatable shaft 106 and a housing 108. The seal assembly 100 comprises a seal ring 110, a circumferential ceramic seal runner 112, and a mounting assembly 210.

The higher pressure fluid cavity 104 may be referred to as a first cavity, and may be, for example, a region of a rotating machine such as a gas turbine engine that receives and directs higher pressure and/or higher temperature airflow. All or a portion of the higher pressure fluid cavity 104 may comprise a buffer air chamber.

The lower pressure fluid cavity 102 may be referred to as a second cavity, and may be, for example, a region of a rotating machine such as a gas turbine engine that receives and directs lower pressure and/or lower temperature airflow. The lower pressure cavity 102 may be a sump or bearing chamber.

The rotatable shaft 106 may define an axis A of the rotating machine and may have a direction of rotation. In the embodiment of FIG. 2, the direction of rotation is shown as counterclockwise. The rotatable shaft may be hollow. A housing 108 may be disposed about or radially outward of the rotatable shaft 106. The housing 108 may be radially displaced from the shaft 106. The housing 108 may be a static structure of the rotating machine (i.e. may not rotate). The housing 108 may be a sump housing or similar structure, and may at least partly define each of the higher pressure fluid cavity 104 and lower pressure fluid cavity 102.

The seal ring 110 is disposed between the housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may also comprise a single annular member. The seal ring 110 may have a radially outward facing surface 114 and a radially inward facing seal surface 116. The seal ring may comprise carbon.

The runner 112 may be an annular member and may be radially displaced from the shaft 106. The runner 112 may be carried by the shaft 106. The runner 112 may be carried by a runner mounting assembly 160 coupled to the shaft 106. The runner 112 may have a radially outward facing seal surface 120 and a radially inward facing mount surface 125 extending axially along the shaft 106. The runner 112 may comprise ceramic. The runner 112 may comprise silicon carbide, silicon nitride, or alumina.

The seal ring 110 may be an archbound carbon seal. The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing surface 116 of the seal ring 110 may sealingly engage the radially outward facing surface 120 of the runner 112. In some embodiments, the radially inward facing surface 116 of the seal ring 110 may contact the radially outward facing surface 120 of the runner 112.

The seal ring 110 and runner 112 may be formed from materials having coefficients of thermal expansion that are matched to effect sealing engagement between the seal ring 110 and runner 112 over a predetermined range of operating temperatures.

The mounting assembly 210 may be carried by the shaft 106, and may extend radially from the shaft 106 to space the runner 112 from the shaft 106. The mounting assembly 210 may comprise a runner mount 211, a first retainer 212, and a second retainer 213.

The runner mount 211 may comprise an annular inner member 216, an annular outer member 218, and a plurality of spokes 219 extending between the inner member 216 and outer member 218. The constituent pieces of the runner mount 211 may be formed separately, or the runner mount 211 may be formed as a unitary piece. The runner mount 211 may comprise metal such as, for example, steel or titanium. Each of the inner member 216, outer member 218, and plurality of spokes 219 may extend between a first axial edge 222 and a second axial edge 223 of the runner mount 211.

The annular inner member 216 may be affixed to, coupled to, or in contact with the shaft 106. The annular inner member 216 may comprise a ring having an inner diameter dimensioned to be interference fit onto the shaft 106. The annular outer member 218 may be affixed to, coupled to, or in contact with the runner 112. The annular outer member 218 may comprise a ring having an outer diameter dimensioned such that the runner 112 is interference fit over the outer member 218.

A plurality of spokes 219 are circumferentially spaced about the inner member 216. Each of the plurality of spokes 219 may extend in a radially outward direction from the inner member 216 to the outer member 218. Each spoke 219 may extend radially outward along a tangent of the inner member 216 or the shaft 106. Each spoke 219 may extend radially outward at an angle to the inner member 216 that is between −10° and +20° of the tangent of the inner member 216. Each of the plurality of spokes 219 may extend radially outward at the same angle to the inner member 216, while in other embodiments each spoke 219 or groups of spokes 219 may extend radially outward at a different angle than other spokes 219.

Figure 4A:
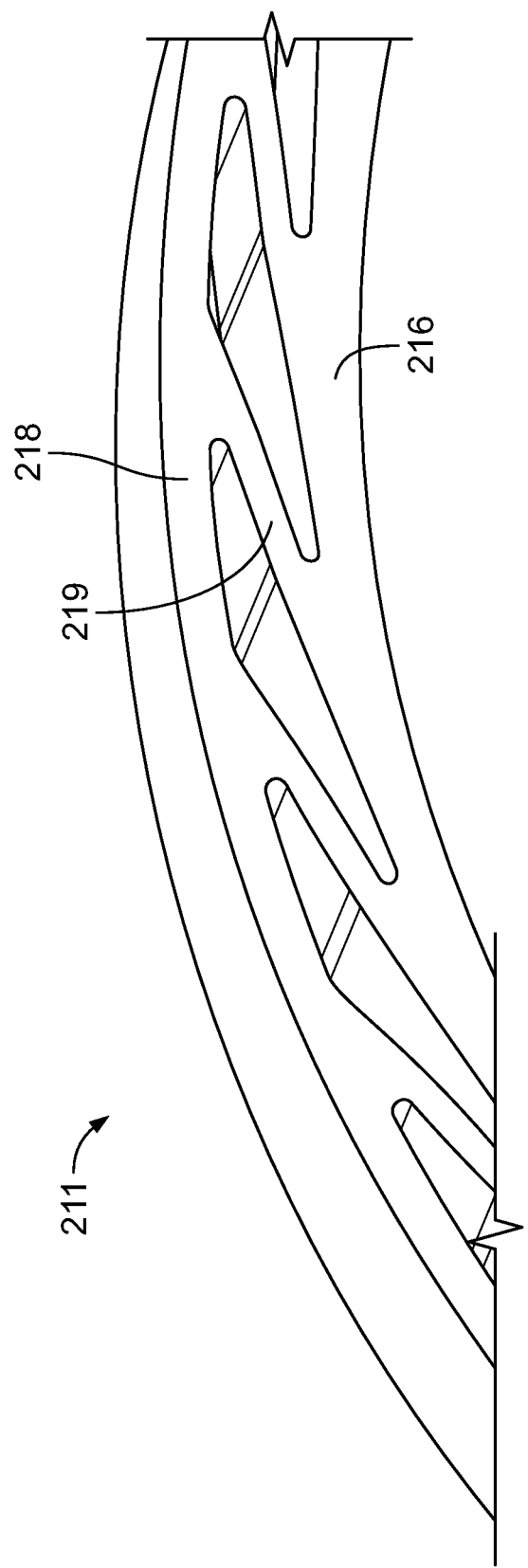
FIG. 4A is an isometric view of a portion of the first runner mount shown in FIG. 3A, in accordance with some embodiments of the present disclosure.
Figure 4B:
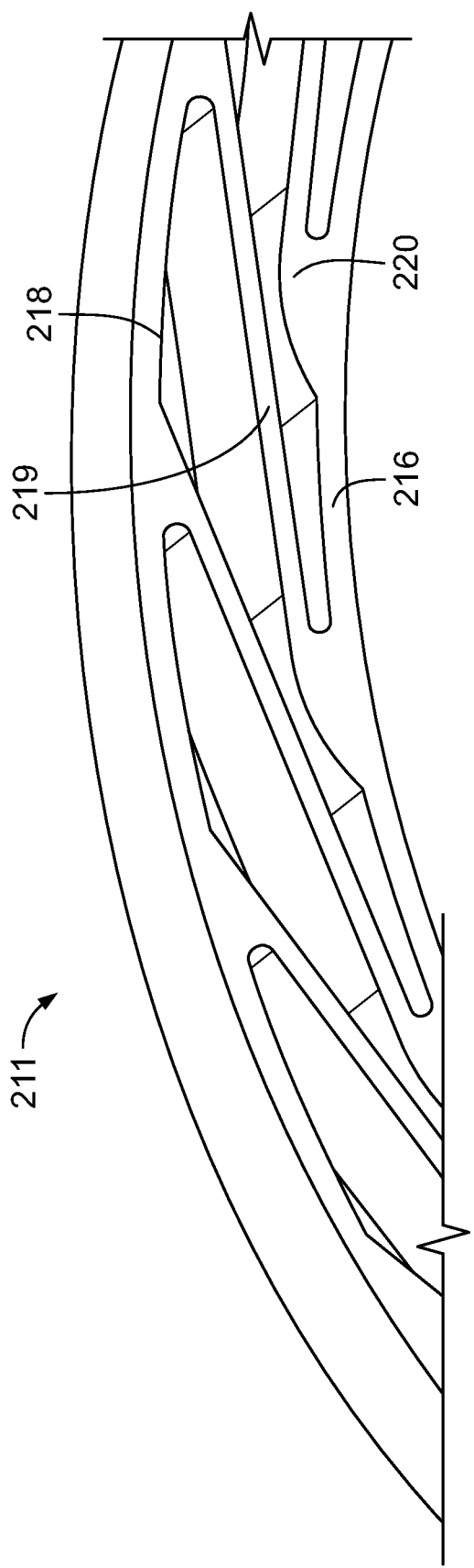
FIG. 4B is an isometric view of a portion of the second runner mount shown in FIG. 3A, in accordance with some embodiments of the present disclosure.
Figure 4C:
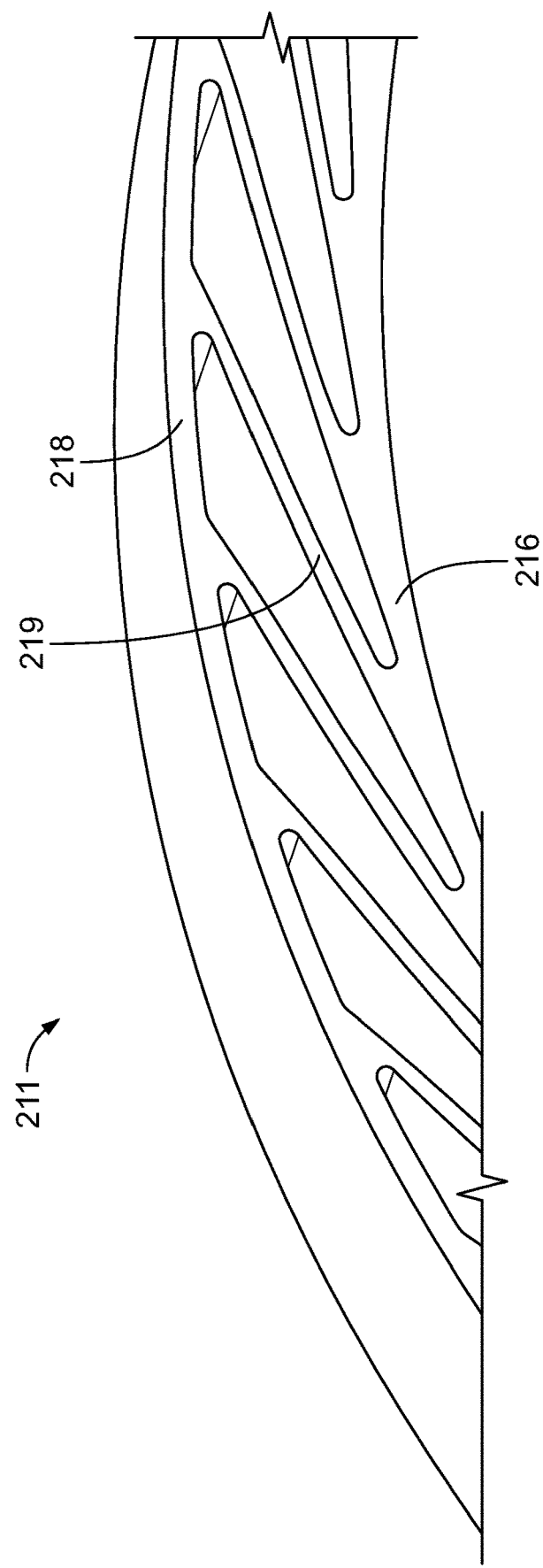
FIG. 4C is an isometric view of a portion of the third runner mount shown in FIG. 3A, in accordance with some embodiments of the present disclosure.

FIGS. 3A, 3B, and 3C provide profile views of various embodiments of a runner mount 211. FIGS. 4A, 4B, and 4C provide isometric views of the embodiments of a runner mount shown in FIGS. 3A, 3B, and 3C, respectively.

The runner mount 211 may have spokes 219 that are substantially linear or spokes 219 that curve as they extend between the inner member 216 and outer member 218. The runner mount 211 may have spokes 219 evenly spaced about the circumference of the inner member 216. The spokes 219, inner member 216, and outer member 218 may collectively define a space having a triangular cross section. The spokes 219 may each have the same thickness, or may have varying thicknesses.

As shown in FIG. 3B, one or both of the inner member 216 and outer member 218 may have a plurality of axial ribs 220 spaced about the circumference of the inner member 216 and/or outer member 218, and each spoke 219 may join the inner member 216 and/or outer member 218 at an axial rib 220.

The runner mount 211 may be axially constrained by a first retainer 212 and second retainer 213. The first retainer 212 may be positioned axially forward of the runner mount 211 and may constrain axially forward motion of the runner mount 211. The second retainer 213 may be positioned axially aft of the runner mount 211 and may constrain axially aftward motion of the runner mount 211. Each of the first retainer 212 and second retainer 213 may define a groove 214 such that the retainers 212, 213 have a radial dimension extending from the shaft 106 beyond the mount surface 125 but without contacting the runner 112. The retainers 212, 213 may avoid contact with the runner 112 in order to prevent a clamping load reacted to the runner 112. The retainers 212, 213 may also define a groove 214 in order to accommodate sealing members, such as a C-seal (not shown) to prevent or avoid the leakage of oil through the runner mount 211.

The runner mount 211 supports the runner 112 and maintains a spacing between the shaft 106 and runner 112. As the rotating machine begins to operate, the metallic shaft 106 will thermally expand at a faster rate than the ceramic runner 112. The runner mount 211 will accommodate this difference in expansion rates and expansion magnitudes. The runner mount 211 will also thermally expand; however, the positioning, dimensions, and angle of spokes 219 cause the spokes 219 to expand in a generally tangential or not directly radial manner, such that radial expansion of the runner mount 211 is more limited than if the spokes 219 were radially directed. Additionally, owing to the slight rotational difference between the inner ring 216 and outer ring 218, during operation the inner ring 216 will reposition slightly counter-clockwise relative to the outer ring 218 as compared to a non-operating condition. As a result of these operational deformations, the runner mount 211 has a smaller magnitude of radial expansion. The runner mount 211 may accommodate the expansion of the shaft 106 and maintain the runner 112 sealingly engaged with the seal ring 110.

Further, in some embodiments the spokes 219 may be formed from a flexible or semi-rigid materials such that the spokes 219 may deflect to accommodate the expansion of the shaft 106 and the shrinking radial dimension of the space between the runner 112 and the shaft 106.

The magnitude and rate of stress on the runner 112 during period of thermal expansion are greatly reduced as compared to existing clip-type runner mounts. Even at the high operating temperatures experienced by certain seal assemblies during engine operation, the disclosed runner mounting assembly 210 supports the runner 112 while sufficiently compliant as to not cause excessive stresses on the runner 112. The runner mount assembly 210 is effective to dissipate stress and/or energy through relatively reduced tangential expansion of the runner mount 211 and/or deflection of the spokes 219 of the runner mount 211.

The seal assembly 100 may further comprise an annular seal member 111. The annular seal member 111 is axially displaced from the seal ring 110 and may comprise a flexible and/or semi-rigid material. The annular seal member 111 may be referred to as a lip seal or a lip seal member. The annular seal member 111 may comprise Teflon or a Teflon derivative material. The annular seal member 111 may be an annular flexible ring that is flexed when positioned relative to the runner 112 (i.e. the annular seal member 111 may be flexed by contact with the runner 112). In some embodiments the annular seal member 111 may be formed as a curved member having a J-shaped cross section. The annular seal member 111 may have a curvilinear face surface 131 that engages the radially outward facing seal surface 120 of the runner 112. The curvilinear face surface 131 may extend from an axially-facing surface to a radially-facing surface, and the radially-facing surface engages the radially outward facing seal surface 120 of the runner 112.

The seal ring 110 may define a plurality of apertures 117 that extend axially through the seal ring 110. During operation, with a higher fluid pressure in the higher pressure fluid cavity 104 as compared to the lower pressure fluid cavity 102, the apertures 117 direct a flow of buffer air from the higher pressure fluid cavity 104 toward the annular seal member 111. The plurality of apertures 117 may be dimensioned and/or spaced about the circumference of the seal ring 110 to achieve a desired flow rate of buffer air.

The flow of buffer air flows through the plurality of apertures 117 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110, by blowing back any oil into the lower pressure fluid cavity 102 if a leakage path develops in the seal ring 110 and/or annular seal member 111.

In some embodiments, the seal assembly 100 further comprises a seal housing 122. The seal housing 122 may be disposed between the runner 112 and the housing 108, and/or between the seal ring 110 and the housing 108, and/or between the annular seal member 111 and the housing 108. The seal housing 122 may comprise a forward seal housing 124 and an aft seal housing 126.

The forward seal housing 124 may define a recess 128 or may cooperate with the aft seal housing 126 to define a recess 128. The recess 128 may be an annular groove. At least a portion of the annular seal member 111 may be disposed in or held in axial position by the recess 128. The forward seal housing 124 may be prevented from axially forward movement relative to the housing 108 by a housing stop 134.

The aft seal housing 126 may comprise an axially-extending portion 121 and a radially-extending portion 123. The axially extending portion 121 may be engaged with or in contact with the housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102.

The forward seal housing 124 and aft seal housing 126 may be integrally formed as a single seal housing 122.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112 across a predetermined range of rotational speeds.

In some embodiments, the seal assembly 100 further comprises one or more of a snap ring 133 and back plate 135. The snap ring 133 may extend between the seal housing 122 and the runner 112, and may be positioned axially aft of the seal ring 110. The back plate 135 may be positioned axially aft of the seal ring 110 and adjacent and/or abutting the snap ring 133.

In a non-operating condition, the shaft 106 is not rotating and the garter spring 129 imparts a radially inward force on the seal ring 110 to maintain the seal ring 110 sealingly engaged against the runner 112. The seal ring 110 sealingly engaged with the runner 112 and seal housing 122 creates a seal between the higher pressure fluid cavity 104 and the lower pressure fluid cavity 102. The seal ring 110 forms a boundary between the higher pressure fluid cavity 104 and the lower pressure fluid cavity 102.

When the rotating machine begins to operate, heat generated by the rotating machine will cause temperatures of all components to rise, including heat generated by friction between the seal ring 110 and runner 112. The metal shaft 106 and mount assembly 210 will thermally expand more and at a faster rate than the ceramic runner 112. As a result, the radial distance between the shaft 106 and runner 112 will decrease. The components of the mount assembly 210 will accommodate this thermal expansion of the shaft 106 and mount assembly 210.

During operation, in embodiments having a seal ring 110 and runner 112 with matched coefficients of thermal expansion, the seal ring 110 and runner 112 will thermally expand at the same or similar rates, assisting in the maintenance of engagement between the seal ring 110 and runner 112 throughout the full range of thermal transients caused by startup and operation of the rotating machine. For embodiments having an annular seal member 111, a differential pressure between the fluid pressures of the higher pressure fluid cavity 104 and the lower pressure fluid cavity 102 may create a flow of buffer air. The flow of buffer air flows through the plurality of apertures 117 of the seal ring 110 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110.

Assembly of the seal assembly 100 shown in FIGS. 1 and 2 requires sliding the first retainer 212 and runner mount 211 over the shaft 106. Then the runner 112 is slid over or coupled to the runner mount 211. Then the second retainer 213 is slid over the shaft 106. A tie bolt or similar apparatus may be used to impart a clamping load on the first retainer 212, runner mount 211, and second retainer 213. The clamping load of the first retainer 212 and second retainer 213 against the runner mount 211 prevents leakage from the higher pressure fluid cavity 104 to the lower pressure fluid cavity 102 through the runner mount 211.

Figure 5:
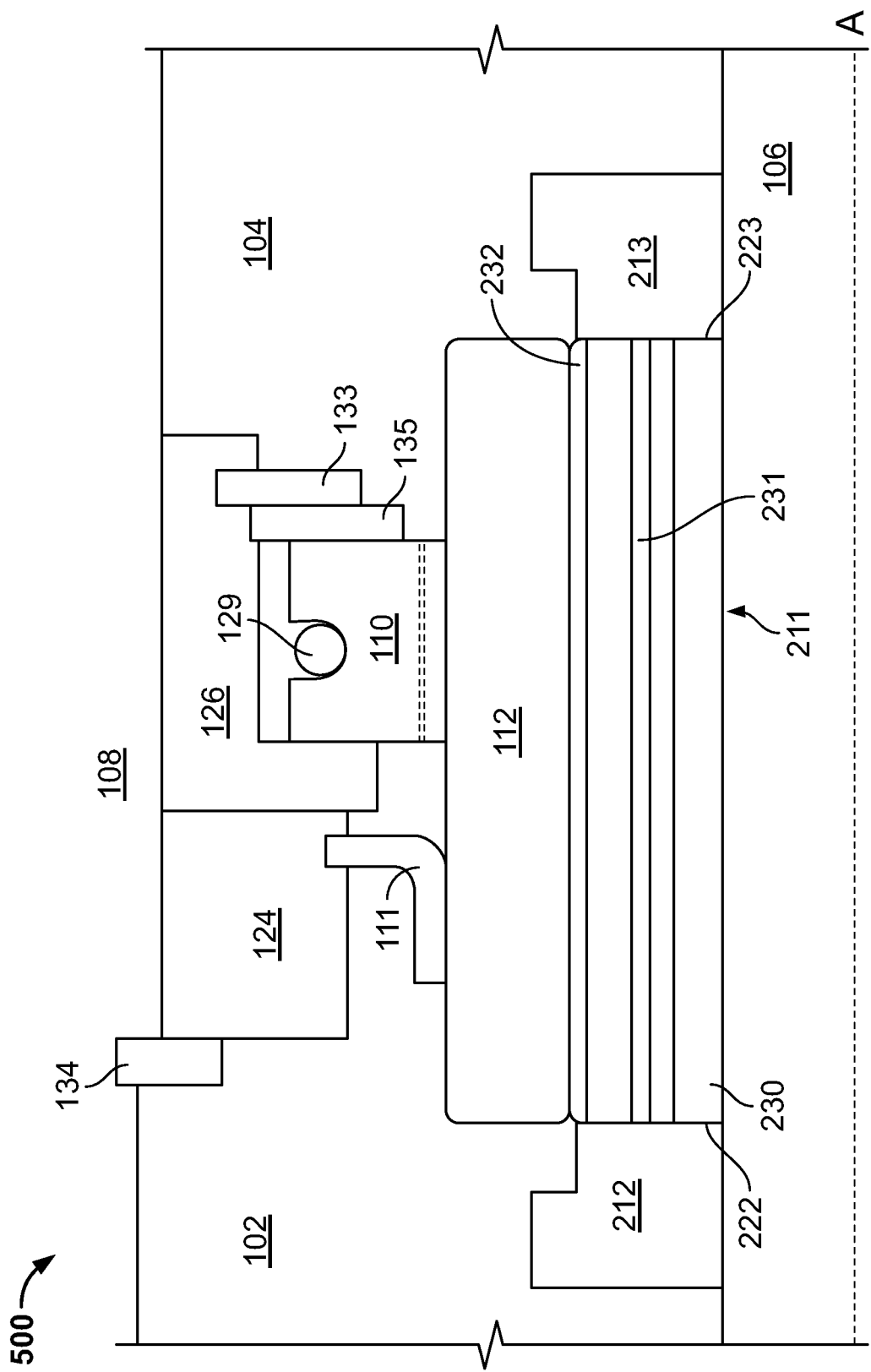
FIG. 5 is a schematic cross sectional view of a seal assembly taken along an axis of the seal assembly in accordance with some embodiments of the present disclosure.
Figure 6:
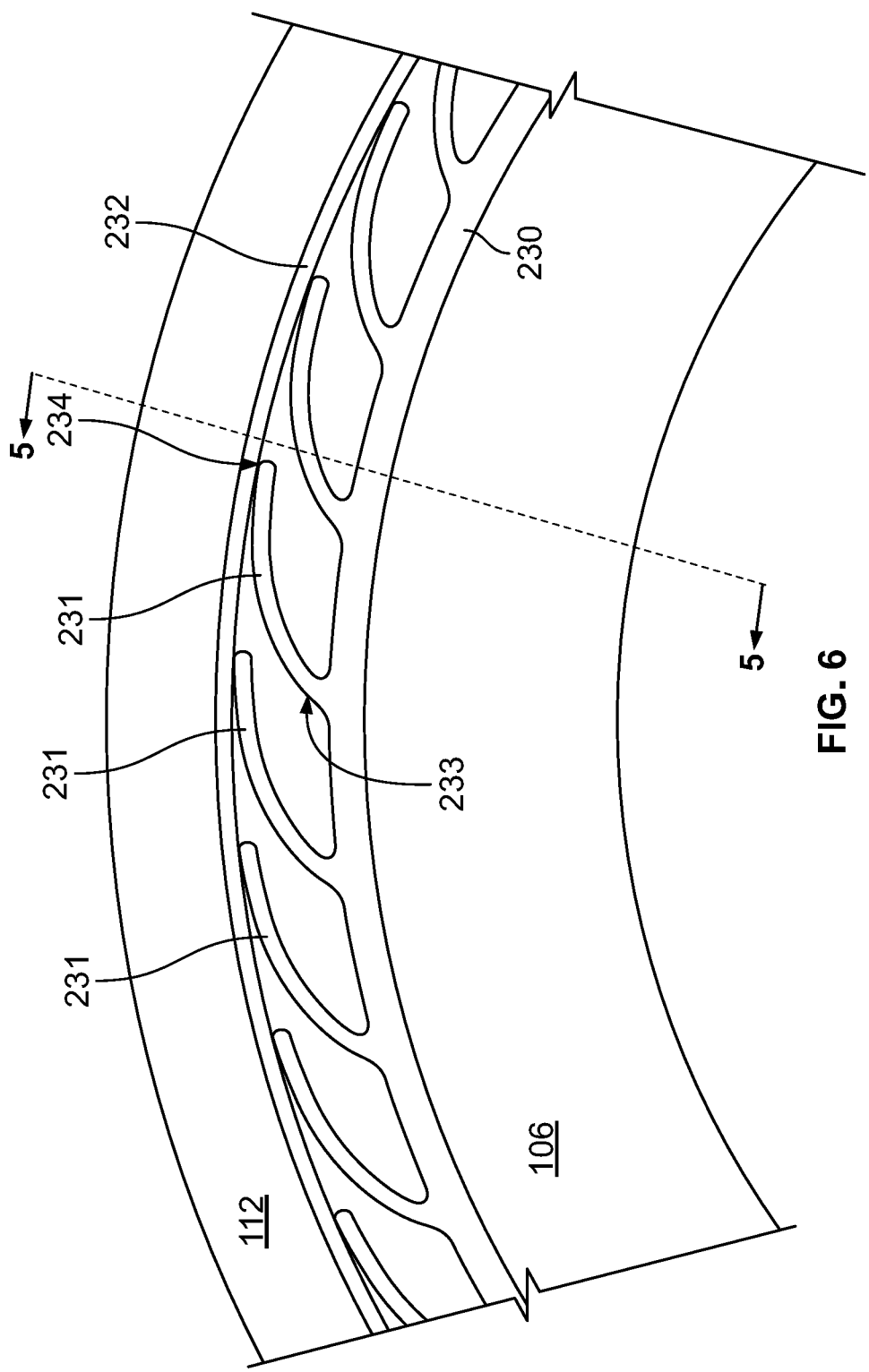
FIG. 6 is a schematic cross sectional view of a seal assembly taken perpendicular to an axis of the seal assembly in accordance with some embodiments of the present disclosure.

Schematic cross sectional views of another embodiment of the seal assembly 100 are provided in FIGS. 5 and 6. FIG. 5 presents a schematic cross section taken along or parallel to an axis of rotation of the shaft 106 and may be referred to as a lateral cross section. FIG. 6 presents a schematic cross section taken perpendicular to the axis of rotation of shaft 106 and may be referred to as an axial cross section. The seal assembly 100 of FIGS. 5 and 6 is substantially the seal assembly 100 of FIGS. 1 and 2 as described above, but has a different embodiment of a runner mount 211, described in greater detail below.

Figure 7:
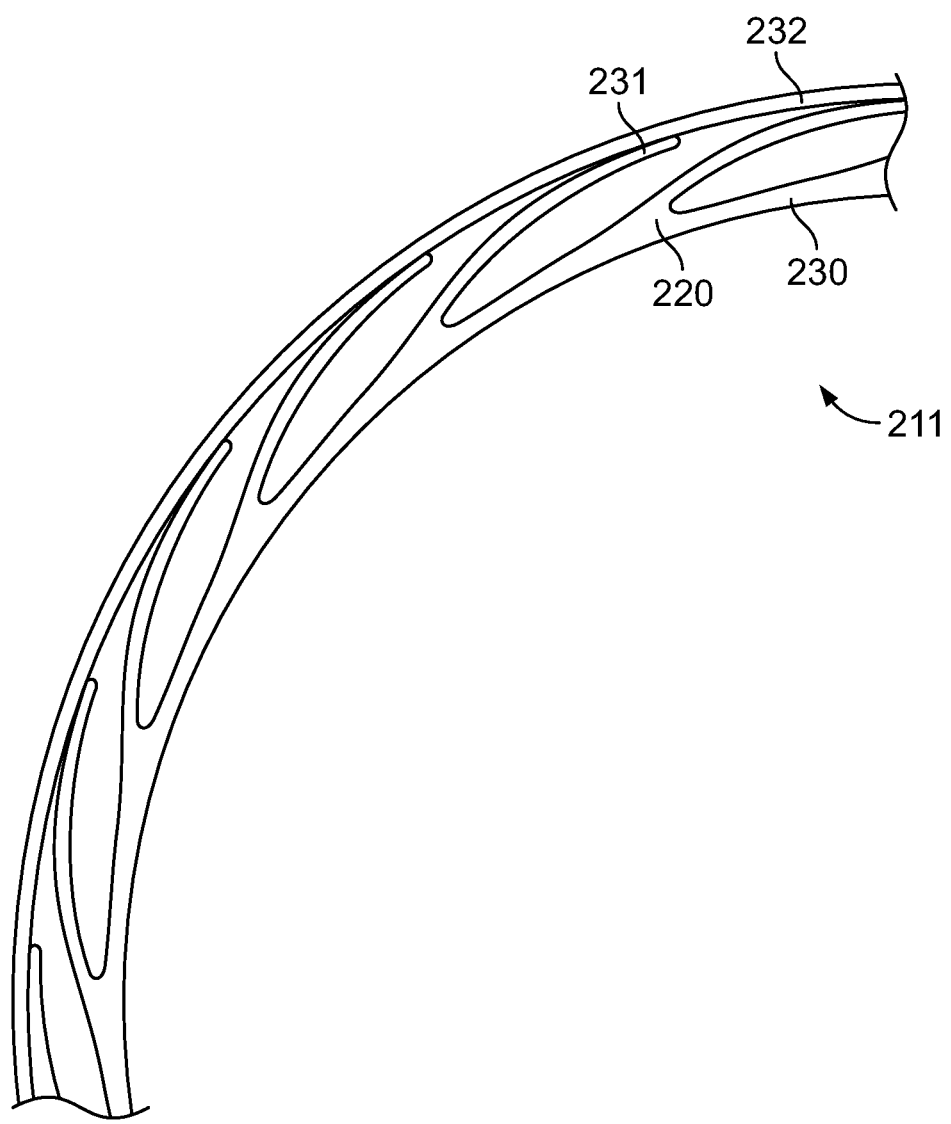
FIG. 7 is a profile view of a portion of a runner mount of the seal assembly in accordance with some embodiments of the present disclosure.
Figure 8:
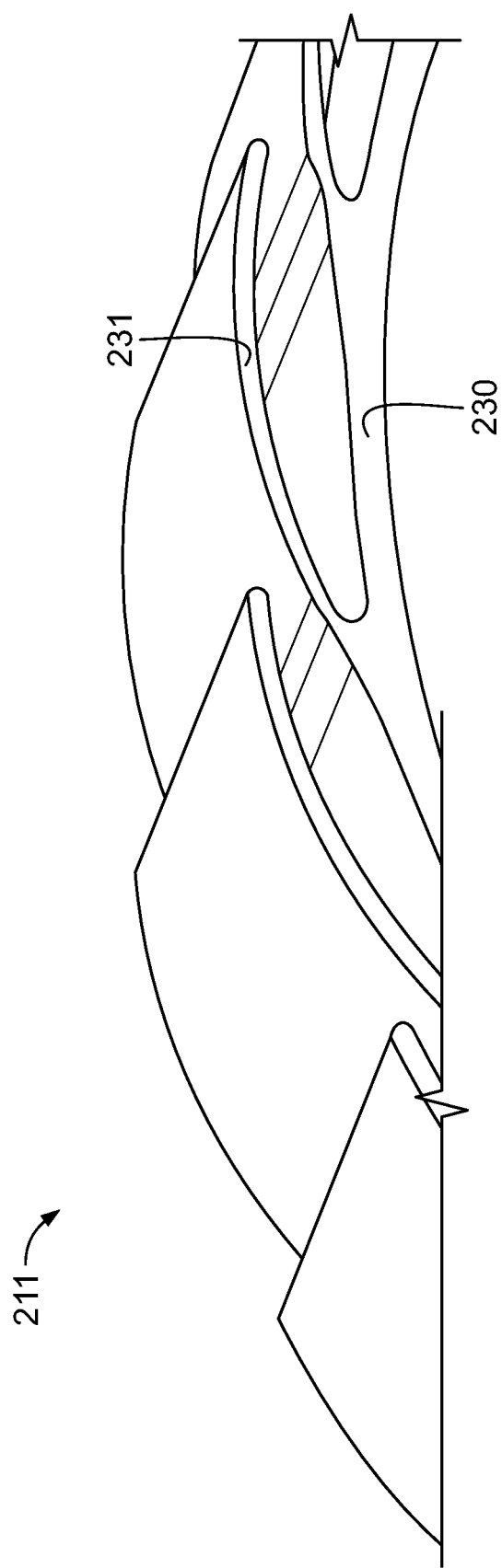
FIG. 8 is an isometric view of a portion of the runner mount shown in FIG. 7, in accordance with some embodiments of the present disclosure.

FIG. 7 provides a profile view of a runner mount 211 for use in the seal assembly presented at FIGS. 5 and 6. FIG. 8 provides an isometric view of the runner mount 211 shown in FIG. 7 without the exterior sleeve member 232.

The runner mount 211 of the embodiment of FIGS. 5 and 6 comprises an annular base member 230 and a plurality of flexible members 231. A sleeve member 232 may be disposed radially outward of the flexible members 231, between the flexible members 231 and the runner 112. The base member 230 may be affixed to the shaft 106, for example by an interference fit.

The plurality of flexible member 231 may be circumferentially spaced about the base member 230. Each flexible member 231 of the plurality of flexible members 231 may extend radially outward from one end 233 affixed to the base member 230 in a direction opposite the direction of rotation of the shaft 106 to a distal end 234. Each flexible member 231 may curve as it extends radially outward from the base member 230. Each flexible member 231 may extend from a first axial edge 222 to a second axial edge 223 of the runner mount 211. Each flexible member 231 may extend radially outward from the base member 230 along a tangent of the base member 230.

Each flexible member 231 may extend radially outward along a tangent of the base member 230 or the shaft 106. Each flexible member 231 may extend radially outward at an angle to the base member 230 that is between −10° and +20° of the tangent of the base member 230. Each of the plurality of flexible members 231 may extend radially outward at the same angle toward the sleeve member 232, while in other embodiments each flexible member 231 or groups of flexible members 231 may extend radially outward at a different angle than other flexible members 231.

The sleeve member 232 may comprise titanium and may buffer the ceramic runner 112 from the flexible members 231 to prevent excessive wear at the contact points between the flexible members 231 and the runner 112. The sleeve member 232 may also distribute pressure more equally between the flexible member 231 and the runner 112. The distal end 234 of one or more flexible members 231 may be affixed to the sleeve member 232.

One or both of the base member 230 and sleeve member 232 may have a plurality of axial ribs 220 spaced about the circumference of the base member 230 and/or sleeve member 232, and each flexible member 231 may join the base member 230 and/or sleeve member 232 at an axial rib 220.

Assembly of the seal assembly 100 shown in FIGS. 5 and 6 requires first sliding the sleeve member 232 over the runner mount 211. The first retainer 212 and runner mount 211/sleeve member 232 combination are then slid over the shaft 106. Then the runner 112 is slid over or coupled to the runner mount 211. Then the second retainer 213 is slid over the shaft 106. A tie bolt or similar apparatus may be used to impart a clamping load on the first retainer 212, runner mount 211, and second retainer 213. The clamping load of the first retainer 212 and second retainer 213 against the runner mount 211 prevents leakage from the higher pressure fluid cavity 104 to the lower pressure fluid cavity 102 through the runner mount 211.

The runner mount 211 illustrated in FIGS. 5 through 8 supports the runner 112 and maintains a spacing between the shaft 106 and runner 112. As the rotating machine begins to operate, the metallic shaft 106 will thermally expand at a faster rate than the ceramic runner 112. The runner mount 211 will accommodate this difference in expansion rates and expansion magnitudes through the deflection of the flexible members 231. The runner mount 211 may accommodate the expansion of the shaft 106 and maintain the runner 112 sealingly engaged with the seal ring 110. The runner mount 211 will also thermally expand; however, the positioning, dimensions, and angle of flexible members 231 cause the flexible members 231 to expand in a generally tangential or not directly radial manner, such that radial expansion of the runner mount 211 is more limited than if the flexible members 231 were radially directed. Additionally, owing to the slight rotational difference between the inner ring 216 and outer ring 218, during operation the inner ring 216 will reposition slightly counter-clockwise relative to the outer ring 218 as compared to a non-operating condition. As a result of these operational deformations, the runner mount 211 has a smaller magnitude of radial expansion.

Figure 9:
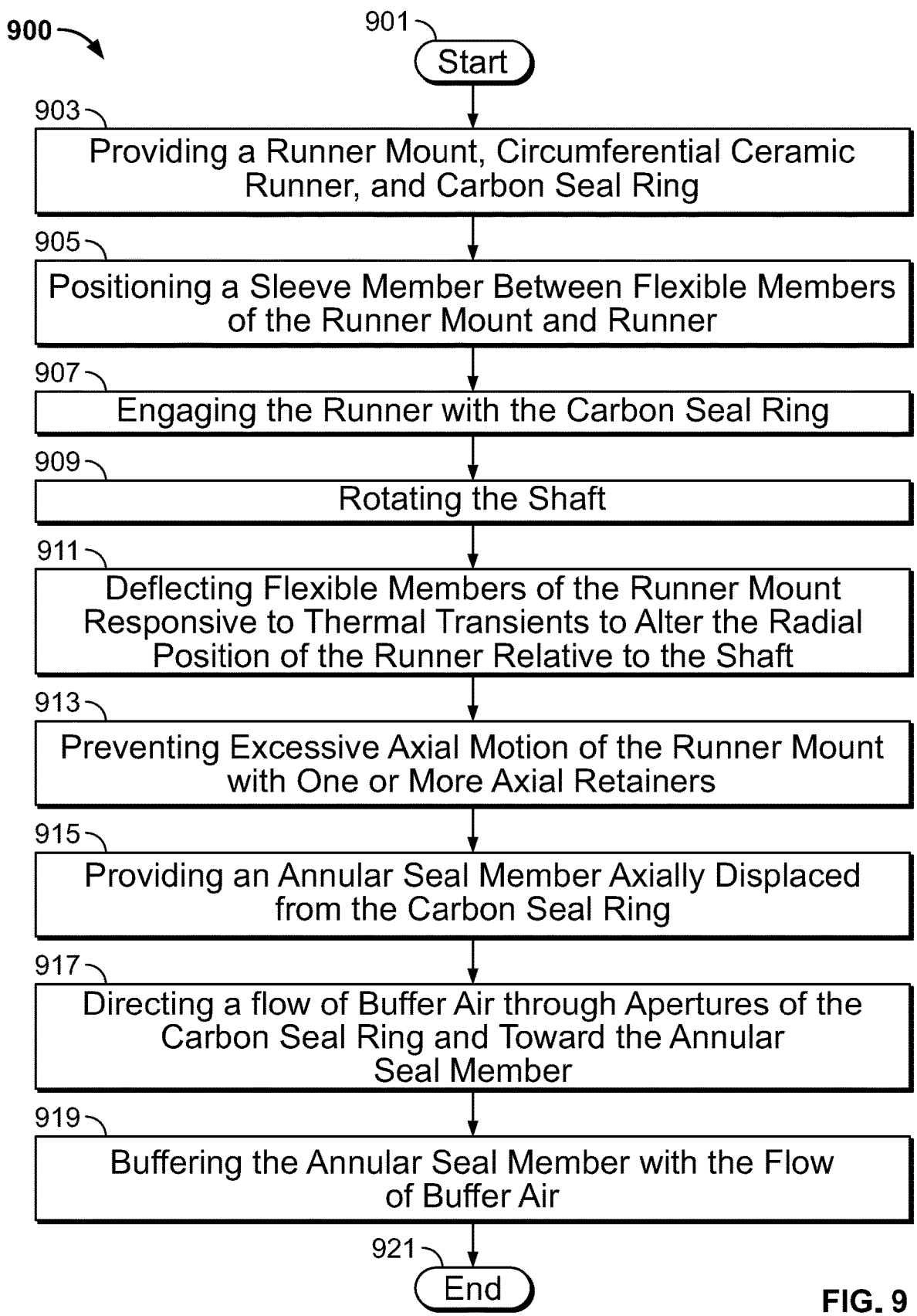
FIG. 9 is a flow diagram of a method in accordance with some embodiments of the present disclosure.

The present disclosure additionally provides methods of sealing a higher pressure fluid cavity 104 from a lower pressure fluid cavity 102. FIG. 9 presents a flow chart of one such method 900. The higher pressure fluid cavity 104 and lower pressure fluid cavity 102 are at least partly disposed between a rotatable shaft 106 and a housing 108 radially displaced from the rotatable shaft 106.

Method 900 starts at Block 901. The steps of method 900, presented at Blocks 901 through 921, may be performed in the order presented in FIG. 9 or in another order. One or more steps of the method 900 may not be performed.

At Block 903, a runner mount 211, annular ceramic runner 112, and carbon seal ring 110 may be provided. The runner mount 211 may comprise an annular base member 230 and a plurality of flexible members 231 extending radially outward from the annular base member 230. The runner mount 211 may comprise an inner member 216, an outer member 218, and a plurality of spokes 219 extending between the inner member 216 and the outer member 218. The runner 112 may be carried by the runner mount 211.

An annular sleeve member 232 may be positioned between the flexible members 231 and the runner 112 at Block 905. At Block 907 the runner 112 may be sealingly engaged with the seal ring 110.

At Block 909 the shaft 106 may be rotated, and at Block 911 the flexible members 231 of the runner mount 211 may deflect responsive to thermal transients to alter the radial position of the runner 112 relative to the shaft 106.

Excessive axial motion of the runner mount 211 may be prevented by one or more retainers 212, 213 at Block 913.

At Block 915 an annular seal member 111 may be provided axially displaced from the seal ring 110. The seal ring 110 may define a plurality of apertures 117, and at Block 917 a flow of buffer air may be directed from the higher pressure fluid cavity 104 through the apertures 117, and toward the annular seal member 111. At Block 919 the annular seal member 111 is buffered by the flow of buffer air.

Method 900 ends at Block 921.

Figure 10:
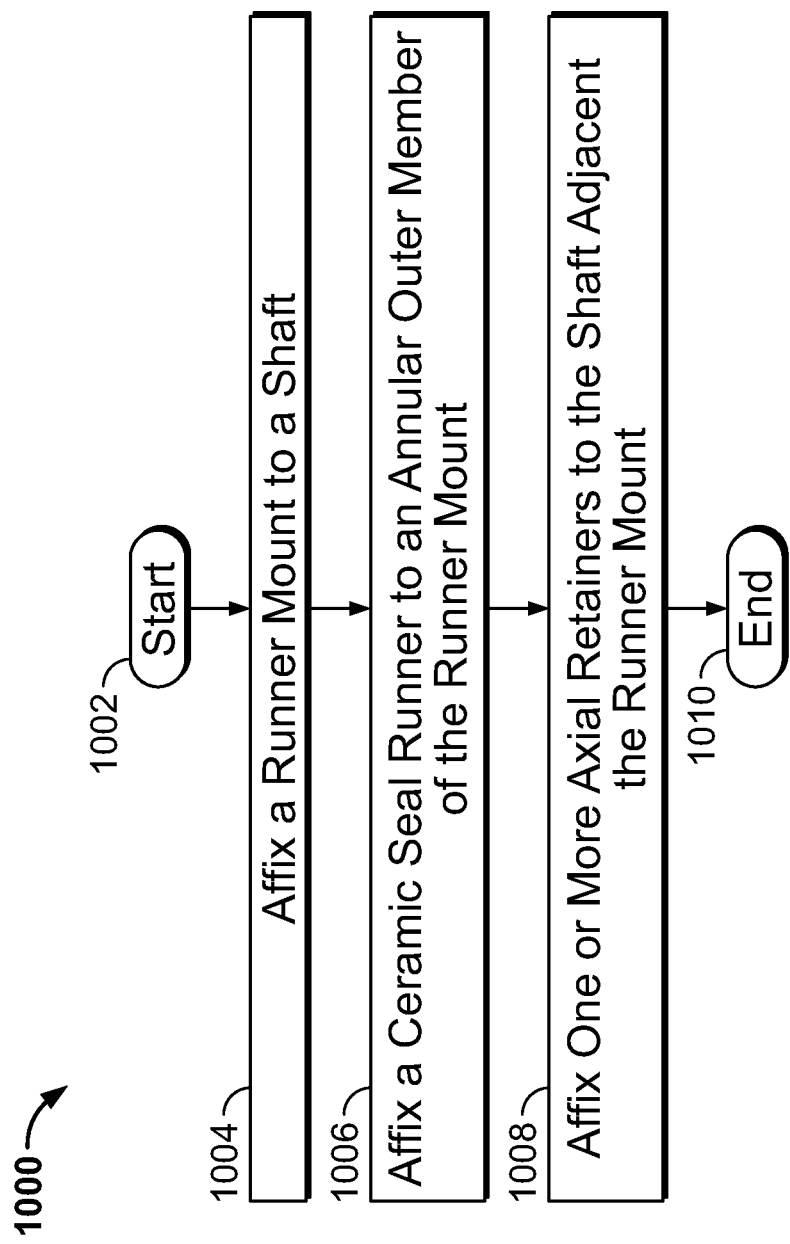
FIG. 10 is a flow diagram of a method in accordance with some embodiments of the present disclosure.

The present disclosure additionally provides methods of mounting a ceramic seal runner 112 in radial and axial alignment to a rotatable shaft 106. FIG. 10 presents a flow chart of one such method 1000. Method 1000 starts at Block 1002. The steps of method 1000, presented at Blocks 1002 through 1010, may be performed in the order presented in FIG. 10 or in another order. One or more steps of the method 1000 may not be performed.

At Block 1004, a runner mount 211 is affixed to the shaft 106. The runner mount 211 may comprise an inner member 216, an outer member 218, and a plurality of spokes 219 circumferentially spaced about the inner member 216 and extending between the inner member 216 and the outer member 218. The runner mount 211 may be affixed to the shaft 106 by providing an interference fit between the inner member 216 and shaft 106.

At Block 1006, a runner 112 is affixed to the annular outer member 218. The runner 112 may be affixed to the outer member 218 by providing an interference fit between the runner 112 and outer member 218. The plurality of spokes 219 may deflect responsive to thermal expansion of the runner mount 211.

At Block 1008, one or more axial retainers 212, 213 may be affixed to the shaft 106 adjacent the runner mount 211.

Method 1000 ends at Block 1010.

The present disclosure provides numerous advantages over existing seal assemblies. For example, the presently disclosed seal assemblies and methods of forming a seal reduce edge loading and overall stresses experienced in clip-style runner mounts. By mounting the runner from the inner diameter of the runner alone, as opposed to mounting from the inner and outer diameters, the runner/runner mount interface along the outer diameter is eliminated and therefore the edge loading at that interface is also eliminated. The disclosed seal assembly provides improved load distribution and minimized tensile stresses in the runner.

By mounting the runner from the inner diameter alone, the presently disclosed seal assembly also frees space along the outer diameter to have a larger sealing surface. This may enable the inclusion of a lip seal along the sealing surface, owing to the greater size of the sealing surface.

The disclosed seal assembly may be advantageously used in applications where a seal assembly is required in an extremely tight space. For example, the seal assembly may be positioned in applications where the radial gap between the shaft and ceramic runner is less than 0.5 inches. The seal assembly was designed for small space applications while maintaining adequate runner support and manufacturability.

The presently-disclosed seal assembly also includes an advantageous fail-safe. In the event of a failure of any one or several of the flexible members 231 and/or spokes 219, any debris caused by this failure (i.e. pieces of the flexible member 231 and/or spoke 219 that failed) would be retained between the retainers 212, 213, shaft 106, and either sleeve member 232 or outer member 218. Although the runner 112 may lose some radial support as a result of this failure, the runner 112 would remain largely sealingly engaged with the seal ring 110 and only minor leakage would be expected.

The fail-safes associated with the disclosed seal assembly ensure no or minimal leakage past the seal during a member failure, thus reducing the likelihood of oil coking, fires, or similar hazards created by seal leakage.

The presently-disclosed seal assembly may also be manufactured less expensively than existing seal assemblies. All components of the mount assembly 210 were designed to ensure traditional machining methods could be utilized to manufacture the components. The components may also be manufactured via 3D printing.

Although examples are illustrated and described herein, embodiments are nevertheless not limited to the details shown, since various modifications and structural changes may be made therein by those of ordinary skill within the scope and range of equivalents of the claims.

What is claimed is:

1. An assembly including a ceramic seal runner mounted to a rotatable shaft, said assembly comprising:
   a rotatable shaft having a direction of rotation;
   an annular ceramic seal runner extending around an axial portion of said shaft; and
   a mounting assembly affixed to said shaft and carrying said seal runner in axial and radial alignment with said shaft, said mounting assembly comprising:
      an annular base member affixed to said shaft;
      a plurality of flexible members circumferentially spaced about said base member, each of said flexible members extending radially outward from one end affixed to said base member in a direction opposite the direction of rotation of said shaft to a distal end; and
      an annular sleeve member positioned so that a radially inner surface engages the distal ends of said flexible members and a radially outer surface engages a radially inner surface of said seal runner.

2. The assembly of claim 1 wherein one or more of said flexible members extend radially outward from said base member along a tangent of said base member.

3. The assembly of claim 2 wherein the distal end of each flexible member is affixed to said sleeve member.

4. The assembly of claim 2 wherein each of said flexible members extend radially outward from said base member along a tangent of said base member.

5. The assembly of claim 4 wherein the distal end of each flexible member is affixed to said sleeve member.

6. The assembly of claim 1 wherein one or more of said flexible members extend axially from a first axial edge of said base member to a second axial edge of said base member.

7. The assembly of claim 6 wherein each of said flexible members extend axially from a first axial edge of said base member to a second axial edge of said base member.

8. The assembly of claim 1 wherein said base member comprises a plurality of axial ribs circumferentially spaced about said base member and extending radially away from said base member, and wherein each of said flexible members is affixed at one end to a rib of said base member.

9. The assembly of claim 8 wherein said sleeve member comprises a plurality of axial ribs circumferentially spaced about the sleeve member and extending radially inward from said sleeve member, and wherein each of said flexible members is affixed at the distal end to a rib of said sleeve member.

10. The assembly of claim 2 wherein each of said flexible members extend radially outward from said base member at an angle between −10° and +20° of a tangent of said base member.

11. A runner mounting assembly comprising:
a rotatable shaft having a direction of rotation;
an annular ceramic seal runner extending around an axial portion of said shaft; and
a mounting assembly affixed to said shaft and carrying said seal runner in axial and radial alignment with said shaft, said mounting assembly comprising:
an annular inner member coupled to said shaft;
an annular outer member coupled to said ceramic seal runner; and
a plurality of spokes circumferentially spaced about said inner member, each spoke of said plurality of spokes extends from said inner member to said outer member in a direction opposite the direction of rotation of said shaft.

12. The runner mounting assembly of claim 11 wherein each of the plurality of spokes extend radially outward from the inner member along a tangent of the inner member.

13. The runner mounting assembly of claim 11 wherein each of the plurality of spokes extend radially outward from the inner member at an angle between −10° and +20° of a tangent of the inner member.

14. The assembly of claim 11 wherein said inner member comprises a plurality of axial ribs circumferentially spaced about said inner member and extending radially away from said inner member, and wherein each of said spokes is affixed at one end to a rib of said inner member.

15. The assembly of claim 14 wherein said outer member comprises a plurality of axial ribs circumferentially spaced about the outer member and extending radially inward from said outer member, and wherein each of said spokes is affixed at a distal end to a rib of said outer member.

16. The assembly of claim 11 wherein each of said spokes extend axially from a first axial edge of said inner member to a second axial edge of said inner member.

17. A method of mounting a ceramic seal runner in radial and axial alignment to a rotatable shaft, said method comprising:
affixing a runner mount to the shaft, the runner mount comprising an annular inner member, an annular outer member, and a plurality of spokes circumferentially spaced about the inner member and extending between the inner member and outer member;
affixing the ceramic seal runner to the annular outer member,
whereby the plurality of spokes deflect responsive to thermal expansion of the runner mount.

18. The method of claim 17 wherein affixing the runner mount to the shaft comprises providing an interference fit between the annular inner member and the shaft.

19. The method of claim 18 wherein affixing the ceramic seal runner to the annular out member comprises providing an interference fit between the ceramic seal runner and the annular outer member.

20. The method of claim 17 further comprising affixing one or more axial retainers to the shaft adjacent the runner mount.

* * * * *